US007532959B2

(12) United States Patent
Ochs et al.

(10) Patent No.: US 7,532,959 B2
(45) Date of Patent: May 12, 2009

(54) MANUAL TRANSMISSION ENGINE REMOTE START SYSTEM AND METHOD

(75) Inventors: Franklin Ochs, Vista, CA (US); Kevin Goodwin, Vista, CA (US)

(73) Assignee: Dei Headquarters, Inc., Vista, CA (US)

( * ) Notice: Subject to any disclaimer, the term of this patent is extended or adjusted under 35 U.S.C. 154(b) by 703 days.

(21) Appl. No.: 10/937,139

(22) Filed: Sep. 8, 2004

(65) Prior Publication Data
US 2006/0052911 A1    Mar. 9, 2006

(51) Int. Cl.
*G05D 1/00*    (2006.01)
(52) U.S. Cl. .................... 701/2; 340/425; 340/426; 701/51; 180/167; 123/179.2
(58) Field of Classification Search ............. 701/2, 701/51; 307/10.6; 180/287, 167; 70/237; 340/425–426; 477/107, 115; 123/179.2
See application file for complete search history.

(56) References Cited

U.S. PATENT DOCUMENTS

| | | | |
|---|---|---|---|
| 4,371,051 A | | 2/1983 | Achterholt |
| 4,392,059 A | * | 7/1983 | Nespor .................. 290/38 D |
| 4,439,163 A | * | 3/1984 | Burmeister et al. ........... 440/86 |
| 4,554,422 A | | 11/1985 | Embrey et al. |
| 5,024,186 A | * | 6/1991 | Long et al. ............... 123/179.4 |
| 5,060,611 A | * | 10/1991 | Krampe et al. .............. 123/320 |
| 5,113,427 A | * | 5/1992 | Ryoichi et al. ............... 340/7.1 |
| 5,334,969 A | * | 8/1994 | Abe et al. .............. 340/426.26 |
| 5,495,925 A | * | 3/1996 | Enk ............................ 192/3.63 |
| 5,614,883 A | * | 3/1997 | Dery et al. ................... 340/458 |
| 5,646,457 A | * | 7/1997 | Vakavtchiev ............... 307/10.6 |
| 5,927,240 A | * | 7/1999 | Maxon ...................... 123/179.3 |
| 5,967,106 A | * | 10/1999 | Schulze et al. ........... 123/179.3 |
| 6,101,439 A | * | 8/2000 | Cutting et al. ................ 701/64 |
| 6,647,328 B2 | * | 11/2003 | Walker ......................... 701/36 |
| 6,710,472 B2 | * | 3/2004 | Murfin ..................... 307/10.6 |
| 6,786,846 B2 | * | 9/2004 | Chang .......................... 477/99 |
| 6,956,467 B1 | * | 10/2005 | Mercado, Jr. ............ 340/426.2 |
| 7,140,338 B2 | * | 11/2006 | Janisch .................... 123/179.2 |
| 7,255,018 B2 | * | 8/2007 | Gumpoltsberger ........... 74/331 |
| 7,324,879 B2 | * | 1/2008 | Blyden et al. .................. 701/2 |
| 7,343,233 B2 | * | 3/2008 | Min et al. ..................... 701/29 |
| 2002/0112688 A1 | * | 8/2002 | Fariz et al. ............... 123/179.2 |
| 2003/0193241 A1 | * | 10/2003 | Murfin ..................... 307/10.6 |

(Continued)

FOREIGN PATENT DOCUMENTS

DE    2816965 A   *  10/1979

(Continued)

OTHER PUBLICATIONS

"Atlastart Remote Vehicle Starter", Installation and Owner'sManual, G.I.T. Security Products, Montreal, Quebec, Canada, cited by other.*

(Continued)

*Primary Examiner*—Cuong H Nguyen
(74) *Attorney, Agent, or Firm*—K. C. Bean, Esq.

(57) ABSTRACT

A remote start method and apparatus for an engine coupled to a manual transmission, the method and apparatus including means for determining whether the manual transmission gears are disengaged and an alarm system coupled to the engine ignition system is armed prior to enabling ignition of the engine.

15 Claims, 9 Drawing Sheets

U.S. PATENT DOCUMENTS

| | | | |
|---|---|---|---|
| 2004/0036625 A1* | 2/2004 | Omata et al. | 340/825.69 |
| 2004/0049324 A1* | 3/2004 | Walker | 701/1 |
| 2004/0097329 A1* | 5/2004 | Chang | 477/99 |
| 2004/0178050 A1* | 9/2004 | Wylde | 200/61.88 |
| 2005/0216148 A1* | 9/2005 | Min et al. | 701/29 |
| 2005/0224034 A1* | 10/2005 | Janisch | 123/179.2 |
| 2005/0251297 A1* | 11/2005 | Dery et al. | 701/2 |
| 2006/0052910 A1* | 3/2006 | Blyden et al. | 701/2 |
| 2006/0052911 A1* | 3/2006 | Ochs et al. | 701/2 |
| 2006/0068973 A1* | 3/2006 | Kappauf et al. | 477/107 |

FOREIGN PATENT DOCUMENTS

| | | | |
|---|---|---|---|
| ES | 2028510 A6 * | 7/1992 |
| FR | 2551240 A1 * | 3/1985 |
| JP | 57158123 A * | 9/1982 |
| JP | 09086219 A * | 3/1997 |
| JP | 2001180328 A * | 7/2001 |

OTHER PUBLICATIONS

"Model 800 + Plus with Alarm", Installation and User Guide, Sep. 28, 2001, DSE Canada Inc., Mont-Royal, Quebec, Canada, cited by other.*

Preprint Proposals for the 2007 Edition of the National Electrical Safety Code 2004; Digital Object Identifier 10.1109/IEEESTD. 2004.322248.*

Top 10 tech cars [fuel efficient cars]; Voelcker, J.; Spectrum, IEEE; vol. 43, Issue 4, Apr. 2006 pp. 34-35 Digital Object Identifier 10.1109/MSPEC.2006.1611757.*

The Design of Vehicle Emergent Calling System Based on GPRS; Yuqi Hu; Yang Liu; Huaiquan Zang; Automation and Logistics, 2007 IEEE International Conference on; Aug. 18-21, 2007 pp. 1220-1224; Digital Object Identifier 10.1109/ICAL.2007.4338755.*

IEEE Recommended Practice for Electrical Installations on Shipboard; 2002 pp. 0_1-258.*

* cited by examiner

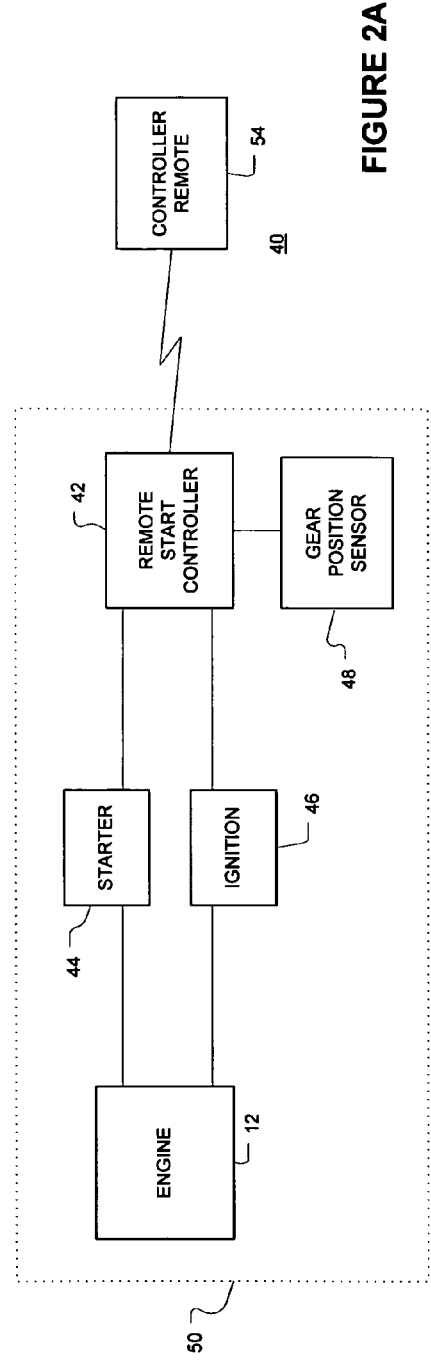
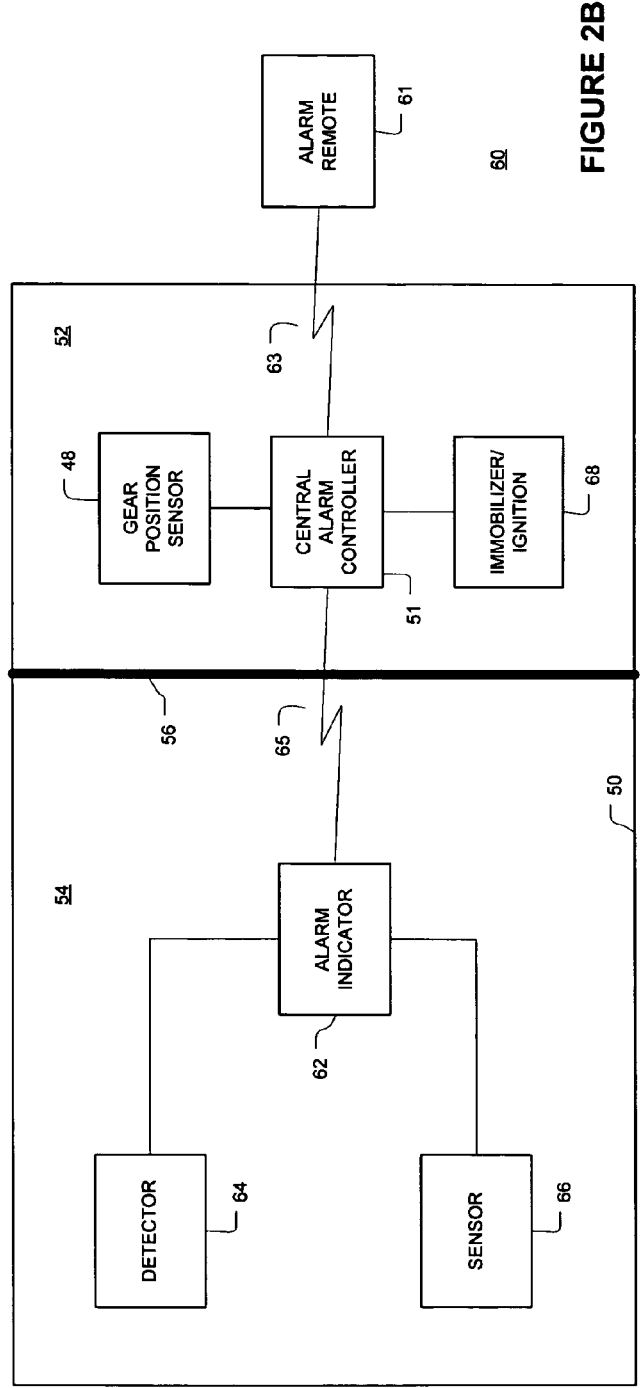

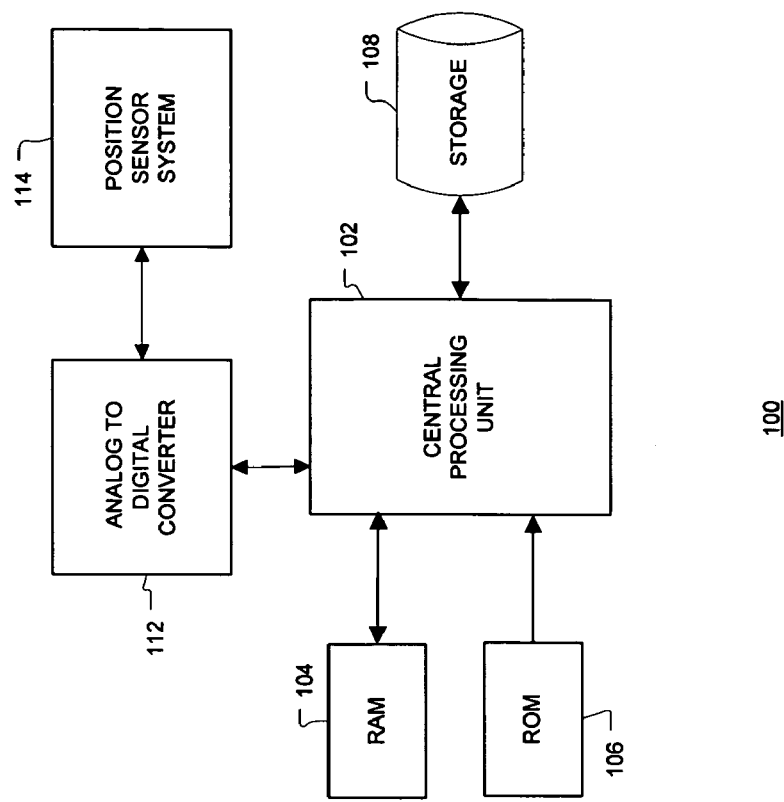
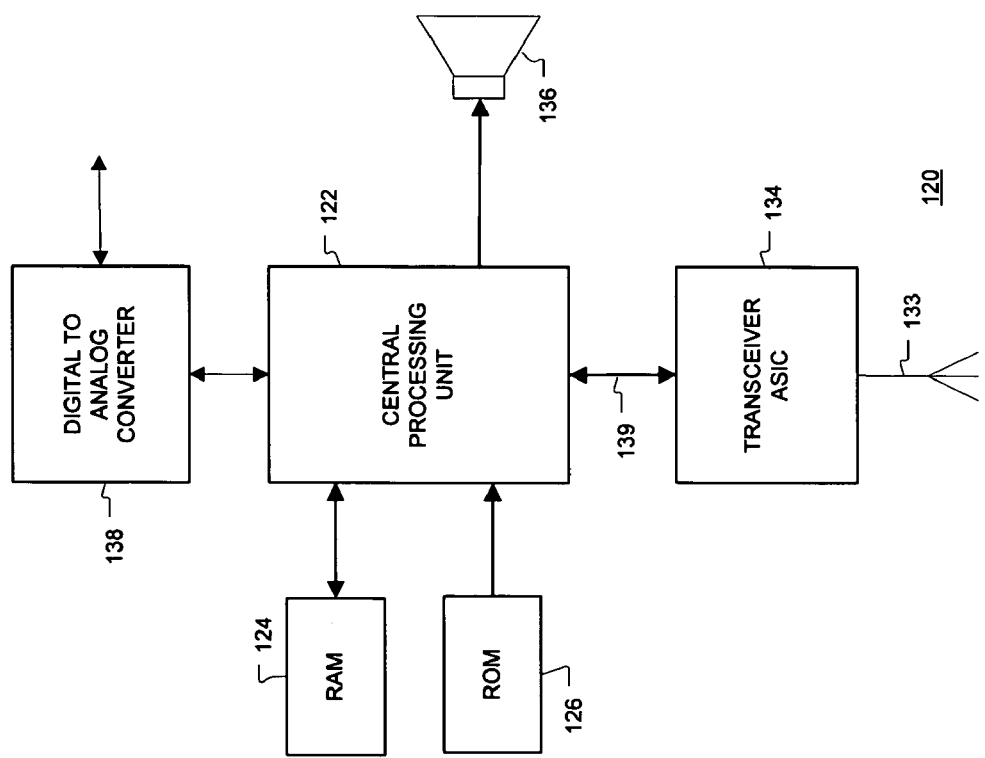
FIGURE 3B
FIGURE 3A

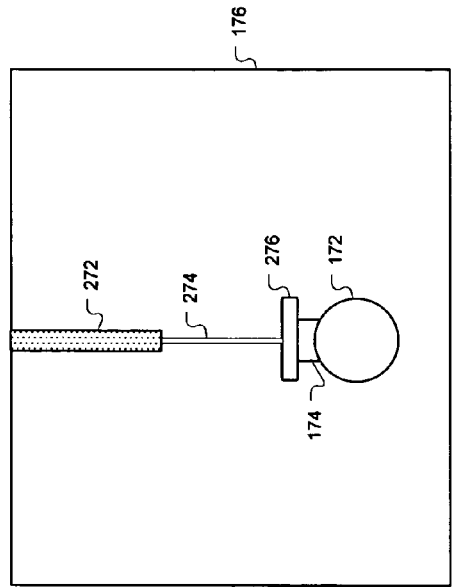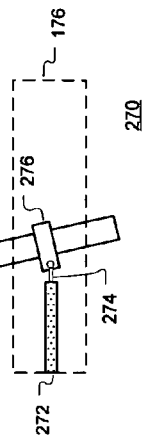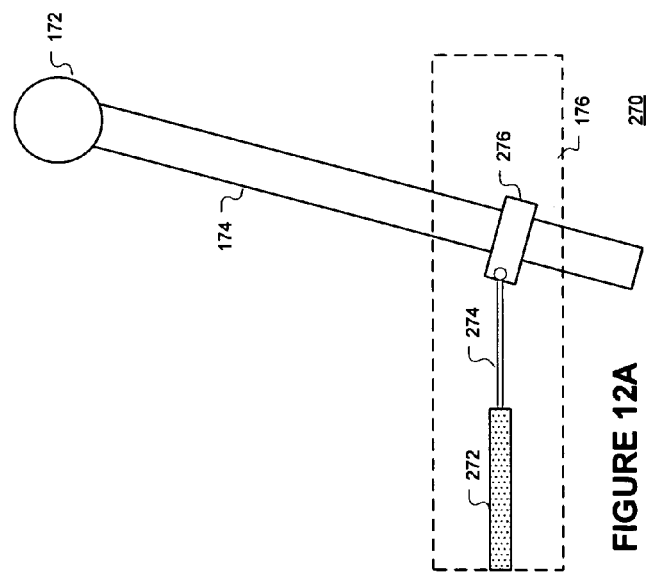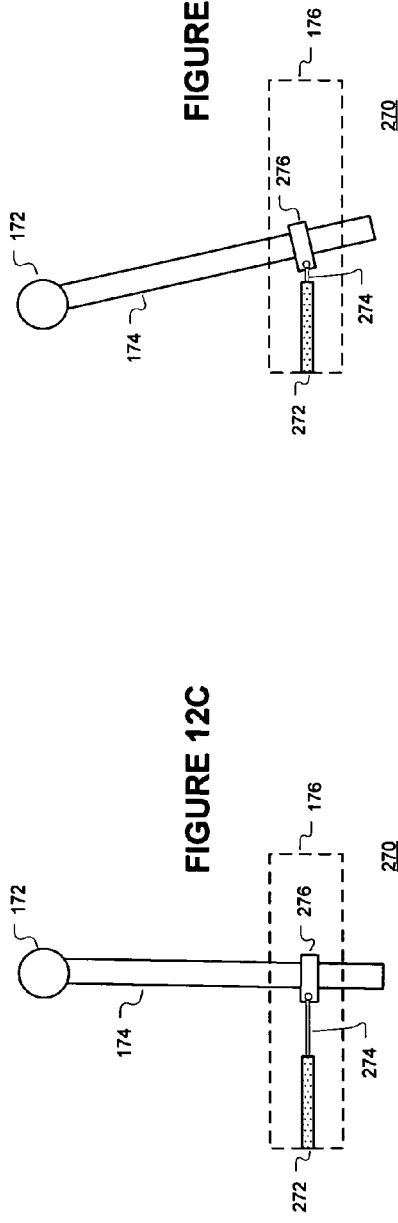
FIGURE 12A
FIGURE 12B
FIGURE 12C
FIGURE 12D

MANUAL TRANSMISSION ENGINE REMOTE START SYSTEM AND METHOD

BACKGROUND

1. Field of the Invention

The invention relates generally to manual transmission systems, and more particularly, to automotive manual transmission systems.

2. Description of Related Art

In certain applications it is desirable to electronically detect when the gears of a manual transmission are disengaged or in neutral. For example, in an automobile having a manual transmission it may be desirable to detect whether the gear selection is neutral (disengaged) prior to starting an engine coupled to the transmission. The automotive and similar manual transmission environments may be harsh for electronic detection components due to vibrational forces, high and low temperatures, dust, dirt, and oil that may be present at or near the manual transmission gear selector or shifter.

A need thus exists for a robust electronic neutral detection system and method for a manual transmission gear selector.

SUMMARY OF THE INVENTION

The present invention includes a method and an apparatus for remotely starting an engine coupled to a manual transmission. In the invention when a remote start request signal is received at a receiver, the invention determines whether the manual transmission gears are disengaged and starts the engine when the manual transmission gears are determined to be disengaged. The present invention may also include an alarm system coupled to the engine ignition system. In this embodiment the invention may determine whether the alarm system is armed and start the engine when the manual transmission gears are determined to be disengaged and the alarm system is determined to be armed. Further, a braking system maybe coupled to the manual transmission. In this embodiment the invention may determine whether the braking system is engaged and start the engine when the manual transmission gears are determined to be disengaged, the braking system is determined to be engaged, and the alarm system is determined to be armed.

In an exemplary embodiment the engine coupled to the manual transmission may be part of a passenger vehicle. The invention may also periodically determine whether the manual transmission gears remain disengaged after the engine is remotely started and stop the engine when the manual transmission gears are determined to have become engaged. In this exemplary embodiment the invention may also determine whether an engine operational parameter is within a predetermined acceptable range and stop the engine when the manual transmission gears are determined to be engaged or the engine operation parameter is determined to be out of range.

In an exemplary embodiment the invention includes a sensor located near the gear shifter of the manual transmission where the sensor level varies based on the gear shifter position. In this embodiment, the invention may determine whether the manual transmission gears are disengaged based on the sensor's present level. In another exemplary embodiment the invention may detect and store the sensor level when the gear shifter position corresponds to no engaged gear and engaged gears. In this embodiment the invention may determine whether the manual transmission gears are disengaged based on the present detected sensor level and the stored detected sensor levels. In an exemplary embodiment the sensor is a linear hall sensor. In this embodiment the invention may further include a permanent magnet fixably coupled to the gear shifter and near the sensor.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2A is a block diagram of an exemplary manual transmission remote start system in accordance with the present invention.

FIG. 2B is a block diagram of another exemplary manual transmission remote start system in accordance with the present invention.

FIG. 3A is a block diagram of an exemplary central alarm controller that may be employed in an exemplary manual transmission remote start system of the present invention.

FIG. 3B is a block diagram of an exemplary gear position sensor system in accordance with the present invention.

FIG. 12A is a simplified side view of a gear selector or shifter and boot including another exemplary position sensor system in accordance with the present invention where the gear selector is engaging a gear.

FIG. 12B is a simplified top view of the gear selector or shifter and boot including the exemplary position sensor system shown in FIG. 12A.

FIG. 12C is a simplified side view of the gear selector or shifter and boot including the exemplary position sensor system shown in FIG. 12A where the gear selector is in a neutral position.

FIG. 12D is a simplified side view of the gear selector or shifter and boot including the exemplary position sensor system shown in FIG. 12A where the gear selector is engaging a gear.

DETAILED DESCRIPTION

Throughout this description, embodiments and variations are described for the purpose of illustrating uses and implementations of the invention. The illustrative description should be understood as presenting examples of the invention, rather than as limiting the scope of the invention.

Figure 1A:
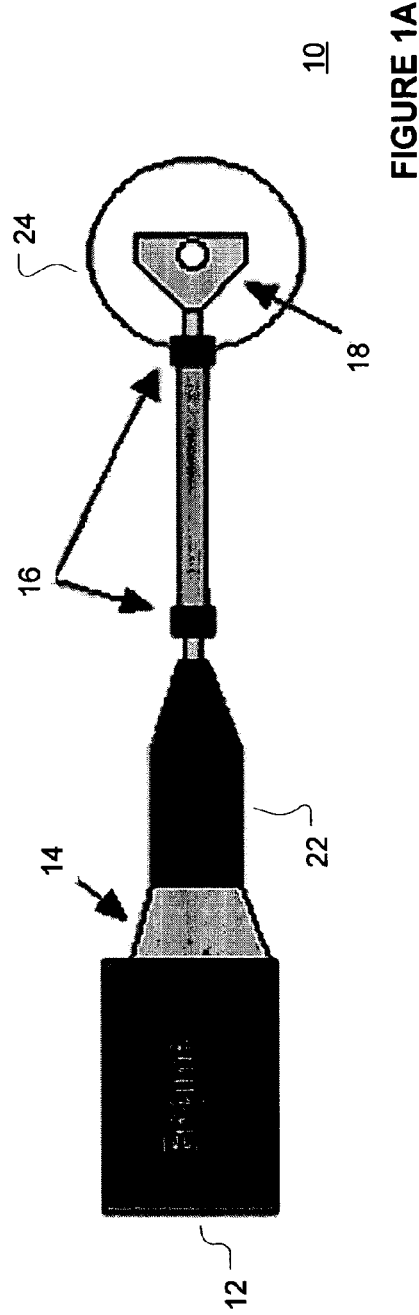
FIG. 1A is a simplified block diagram of an exemplary automotive engine and drive train system in which the present invention may be employed.
Figure 1B:
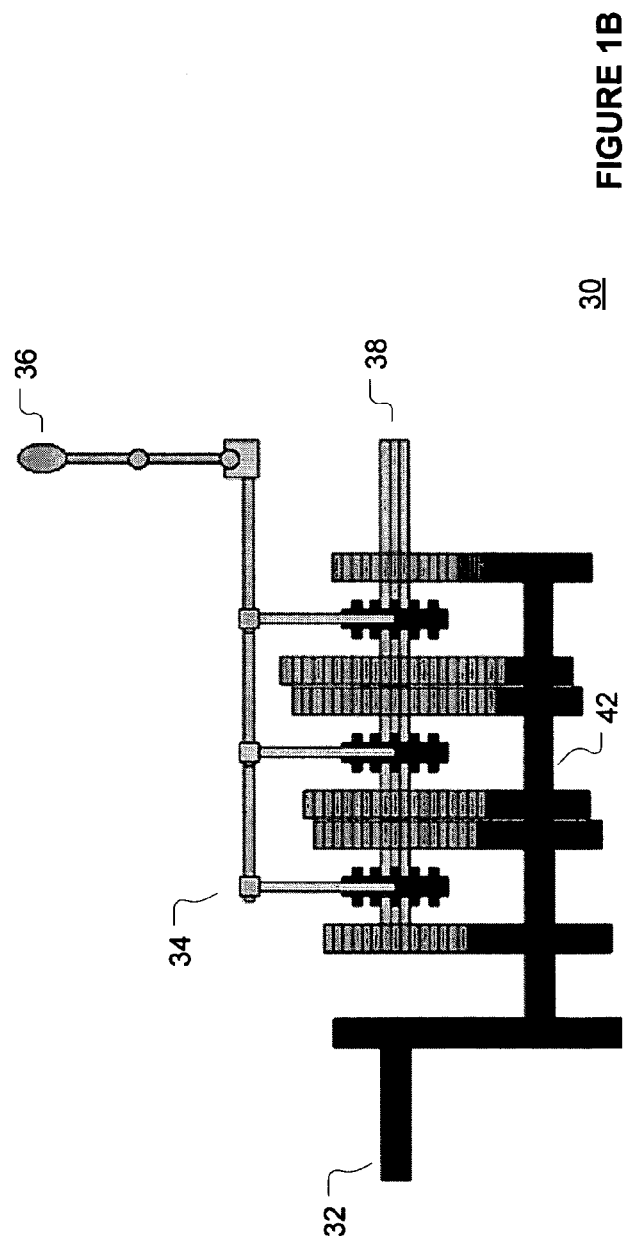
FIG. 1B is a simplified diagram of an exemplary manual transmission in which the present invention may be employed.

FIG. 1A is a simplified block diagram of an exemplary automotive engine and drive train system 10 in which the present invention may be employed. The system 10 includes an engine 12, a clutch 14, a transmission 22, a drive shaft 16, a differential 18, and a wheel 24. In this exemplary system, the transmission 22 is a manual transmission that is disengagably coupled to the engine 12 via the clutch 14. The drive shaft 16 couples the transmission 22 to the differential 18. The differential 18 couples the drive shaft 16 to one or more wheels 24 in this exemplary system 10. FIG. 1B is a simplified diagram of an exemplary manual transmission 30 that may be used in the system 10 and the present invention. The transmission 30 includes a lay shaft 42 that couples a first shaft 32 to a second shaft 38 via gear engaged by a gear selector fork 34. The shaft 32 may be coupled to the clutch 14 and the shaft 38 may be coupled to the drive shaft 16. In the FIG. 1B, the gear selector fork 34 is neutral (no engaged gears). The gear shifter 36 may be operated to cause the fork 34 to engage a gear and thus couple shaft 32 to shaft 38.

FIG. 2A is a block diagram of an exemplary remote start system 40 in accordance with the present invention. The system 40 includes a remote start controller 42, a gear position sensor 48, an ignition 46, a starter 44, a engine 12, and a controller remote 54. These components, other than the controller remote 54 are fixably located in a vehicle 50 having a manual transmission in one exemplary embodiment. The gear position sensor 48 is operatively coupled to the remote start controller 42 and provides an indication of whether the manual transmission gear selection is neutral or disengaged. The remote start controller 42 is coupled to the ignition 46 and the starter 44 and wirelessly with the controller remote 54.

The ignition 46 and the starter 44 are also coupled to the engine 12. In an exemplary embodiment, a user via the controller remote 54 may remotely request ignition of the engine 12. The remote start controller 42 may direct the ignition 46 and the starter 44 to start the engine 12 when the gear position sensor 48 indicates that the manual transmission is not engaged (in neutral).

FIG. 2B is a simplified block diagram of an exemplary alarm system 60 that includes remote start capability in accordance with the present invention where a section is fixably implemented in the vehicle 50 having a manual transmission. In an exemplary embodiment the vehicle 50 includes a passenger compartment 52 and engine compartment 54 that are separated by an engine wall 56. The mobile alarm system 60 includes a central alarm controller 51, an alarm indicator 62, a detector 64, a sensor 66, an immobilizer 68, a gear position sensor 48, and an alarm remote 61. In the exemplary embodiment alarm system 60, the alarm indicator 62 is coupled to the detector 64 and the sensor 66. The indicator 62 may be coupled to the detector 64 and sensor 66 by one or more wires or wirelessly.

The detector 64 may detect the condition of one or more alarm triggering devices, such as a hood pin, motion detector, or other device. The sensor 66 may sense one or more measurable physical conditions of object(s) located in the engine compartment 54, such as the engine temperature, engine revolutions per minute ("RPM"), or other measurable physical conditions. The alarm indicator 62 may receive data generated by the sensor 66 and detector 64, format the data, and forward the data to the central alarm controller 51 via a wireless link 65 or a vehicle data bus. The alarm indicator 62 may receive alarm state information from the central alarm controller 51 and generate an alarm indication, such as powering one or more sirens, when an alarm condition is detected or indicated by the central alarm controller 51.

In the exemplary alarm system 60, the central alarm controller 51 also communicates with the immobilizer/ignition 68, gear position sensor 48, and the alarm remote 31. When an alarm state is detected/tripped, the central alarm controller 51 may direct the immobilizer 68 to restrict engine activation, many immobilizers 68 are known to those of skill of the art of mobile alarm systems. The alarm remote 61 may arm and disarm the alarm system 51 and request a remote start via a wireless communication link 63 with the central alarm controller 51. The alarm remote 61 may also receive alarm and engine state information via the wireless communication link 63 from the central alarm controller 51 or a vehicle data bus. The alarm remote 61 may display this information in a format discernable by a user. The mobile alarm system 60 may employ any wireless communication protocol for the wireless links 65 and 63. The wireless communication protocol for the links 65 and 63 may the same or different. In one embodiment, the wireless link 63 may be a highly secure link and the wireless link 65 may be a moderately secure link based on the employed communication protocols.

FIG. 3A is a block diagram of an exemplary central alarm controller or remote start controller 120 that may be employed in an exemplary manual transmission remote start system of the present invention. The exemplary device 120 may include a CPU 122, a RAM 124, a ROM 126, a transceiver application specific integrated circuit (ASIC) 134, an alarm state indicator 136, in particular, a speaker or a siren, a DAC 138, a light, or other indicator transmitted via a wireless cellular network, and an antenna 133. The ROM 126 is coupled to the CPU 122 and may store the program instructions executed by the CPU 122. The RAM 124 is coupled to the CPU 122 and may store temporary program data, sensor data, detector data, and gear position sensor 48 messages. The transceiver ASIC 134 may include an instruction set necessary to communicate data signals over the wireless link 63 (FIG. 2B). The ASIC 134 is coupled to the antenna 133 to communicate signals via the link 63. When a data signal is received by the transceiver ASIC 134, the data is transferred to the CPU 122 via a serial bus 139.

FIG. 3B is a block diagram of an exemplary gear position sensor system 100 in accordance with the present invention. The exemplary gear position sensor system 100 may include a central processing unit ("CPU") 102, a random access memory ("RAM") 104, a read only memory ("ROM") 106, a storage unit 108, an analog to digital converter ("ADC") 112, and a position sensor system 114. The CPU 102 may receive digitized gear position data from the position sensor system 114 and forward the gear position data to the central alarm controller 51 or 120 or place a neutral signal indication signal on a vehicle data bus. The ROM 106 may store program instructions to be executed by the CPU 102. The RAM 104 may be used to store temporary program information and data received from the position sensor system 114. The storage unit 108 may comprise any convenient form of data storage and may be used to store the sensor system data. The analog to digital converter 112 may be employed to receive analog signals from position sensor system 114.

Figure 4:
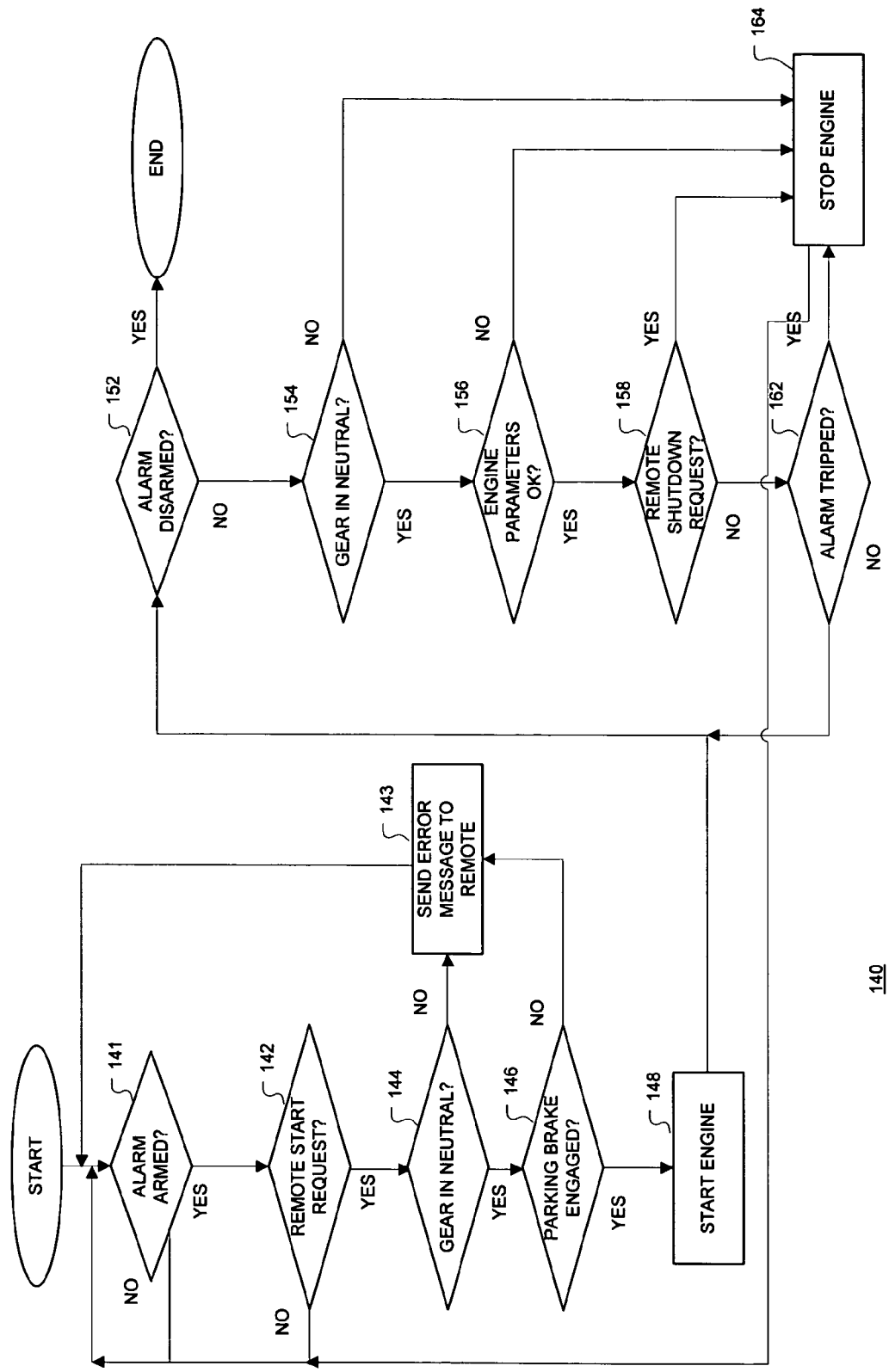
FIG. 4 depicts an exemplary manual transmission remote start process that may be executed or performed by an exemplary alarm indicator in accordance with the teachings of the present invention.

FIG. 4 depicts an exemplary manual transmission remote start process 140 that may be executed or performed by an exemplary alarm controller 51 or 120 in accordance with the teachings of the present invention. In the exemplary remote start process 140, the underlying system 40 and 60 must be armed before a remote start request is processed/considered (step 141). Upon receipt of a remote start request (step 142) when the system is armed (step 141), the process 140 determines whether the manual transmission is in a neutral state (gears disengaged) (step 144). In an exemplary embodiment a gear position sensor 48, 100 may provide this indication. When the gears are not disengaged (neutral), the exemplary process 140 generates an error message (step 143) and starts again (step 141).

In an exemplary embodiment the process 140 may also determine whether a parking brake is engaged (step 146) prior to directing engine ignition (step 148). Parking brake engagement indication may be provided by techniques known to those of skill in the art. The process 140 may also determine whether vehicle door locks are in a locked position prior to engine ignition. In an exemplary embodiment, the process 140 may lock all doors prior to step 148. The process 148 may also direct the alarm system to ignore any shock based sensors prior to step 148 since engine ignition may trip such an alarm. In an alarm system having an engine immobilizer, the process 140 may also deactivate the engine immobilizer prior to performing step 148. In this exemplary process 140, upon engine ignition the process enters a monitoring state to determine whether the engine should be shutdown or stopped. When the process 140 determines the alarm is disarmed (step 152), the process 140 may end. Otherwise the exemplary process determines whether the gears remain in neutral (step 154), engine operation parameters are within guidelines/limits (such as temperature, revolutions per minute, fuel level, oil level, oil pressure, or other operational parameter) (step 156), a remote shutdown request has been received (step 158), or the alarm is tripped (step 162). If any of these events occur, the exemplary process 140 may stop or shutdown the engine 164.

Figure 6C:
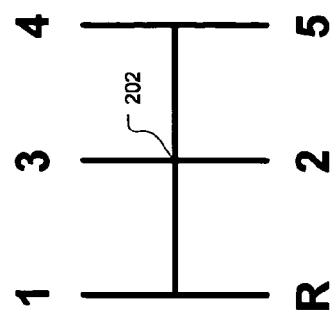
FIGS. 6A to 6C are diagrams of gear shift patterns of a manual transmission that may be employed in an embodiment of the present invention.
Figure 6A:
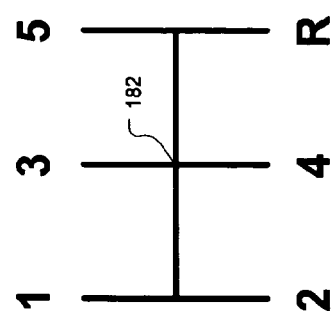
Figure 6B:
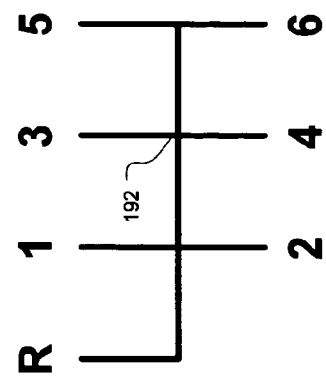
Figure 5A:
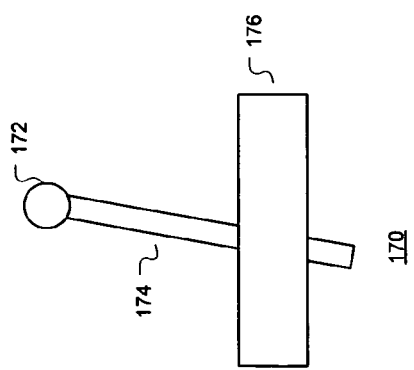
FIG. 5A is a simplified side view of a gear selector or shifter and boot that may be employed in an embodiment of the present invention.
Figure 5B:
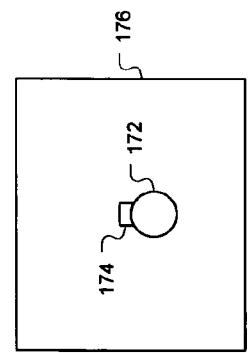
FIG. 5B is a simplified top view of a gear selector or shifter and boot that may be employed in an embodiment of the present invention.

In the systems 40, 60, and process 140, a manual transmission gear position (disengaged or neutral) sensor is employed to provide an indicator of the transmission state. In an exemplary embodiment the manual transmission gear state is determined by the position of a gear selector. In other embodiments sensors could be placed within the manual transmission to provide an indication of gear status. FIG. 5A is a simplified side view of a gear selector 170 that may be employed in an embodiment of the present invention. The selector includes a shift ball 172, a gear shifter rod 174, and a boot 176. In an exemplary embodiment the rod 174 is coupled to a gear selector fork and the ball 172 is coupled to the rod 174. The boot 176 covers the rod and provides a operational window or area where the rod may be shifted or moved by a user to engage the transmission gears via the fork (34 in FIG. 1B). FIG. 5B is a simplified top view of the gear selector 170 shown in FIG. 5A. In most manual transmissions a user moves the rod to a predetermined location to engage or disengage a gear of the manual transmission. FIGS. 6A to 6C are diagrams of exemplary manual transmission gear shift patterns. As shown in these figures, in most gear patterns, the center position is the neutral or all transmission gears disengaged position (182, 192, 202 in FIGS. 6A, 6B, and 6C, respectively).

Figure 7B:
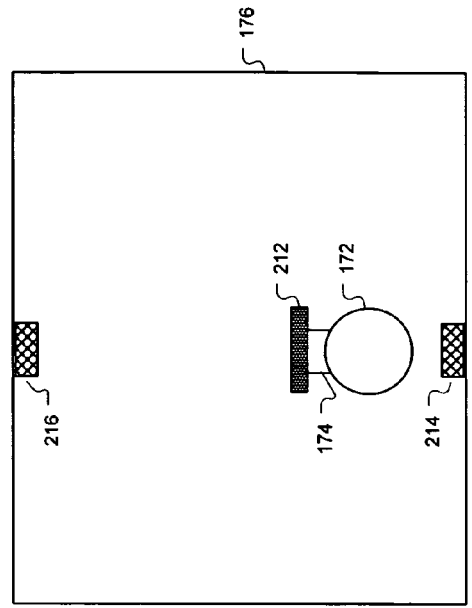
FIG. 7B is a simplified top view of the gear selector or shifter and boot including the exemplary position sensor system shown in FIG. 7A.
Figure 7D:
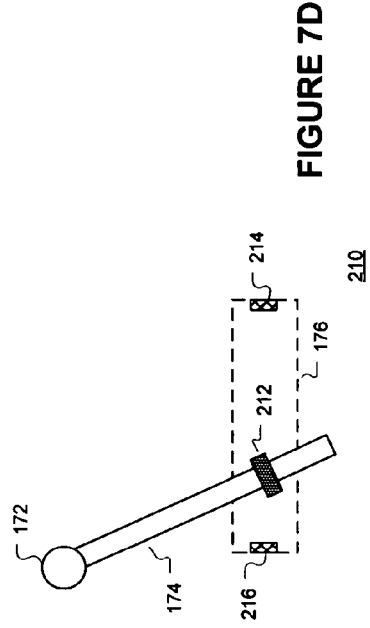
FIG. 7D is a simplified side view of the gear selector or shifter and boot including the exemplary position sensor system shown in FIG. 7A where the gear selector is engaging a gear.
Figure 7A:
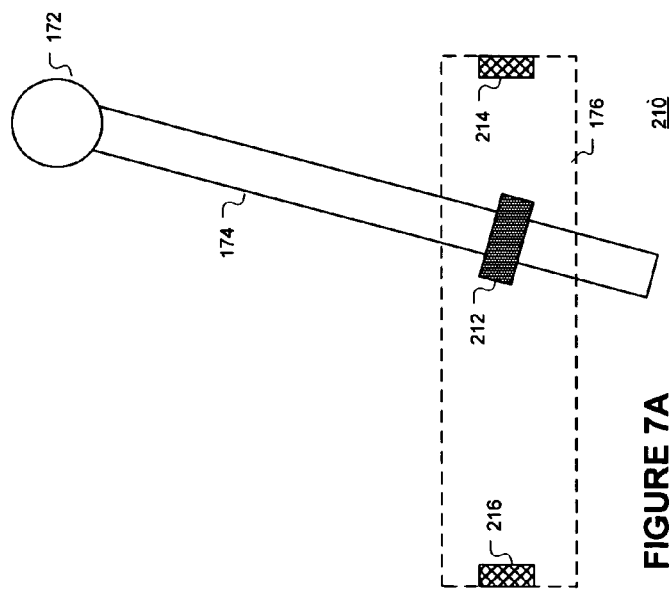
FIG. 7A is a simplified side view of a gear selector or shifter and boot including an exemplary position sensor system in accordance with the present invention where the gear selector is engaging a gear.

Accordingly, an exemplary embodiment of the present invention may employ one or more sensors to determine when the gear selector 170 is in a neutral position. FIGS. 7A to 7D are simplified block diagrams of one exemplary sensor system 210 in accordance with the present invention. FIG. 7A is a cutaway side view and FIG. 7B is a top view of the exemplary system 210. The exemplary system 210 includes a plurality of linear hall-effect sensors 214, 216 and a permanent magnet 212. The permanent magnet is fixably coupled to the rod 174 so that it remains within the boot area 176 during transmission gear shifts. In this exemplary embodiment the hall-effect sensors 214 and 216 are placed on opposite ends of the boot 176 and never directly contact the magnet 212. The sensor 214 and 216 placement may vary as a function of the transmission shift pattern (neutral transmission rod position). In an exemplary embodiment a single linear hall-effect sensor may be employed to determine when the rod 174 location corresponds to neutral.

Figure 7C:
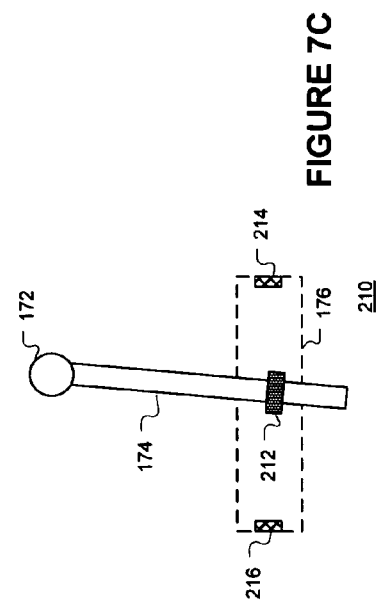
FIG. 7C is a simplified side view of the gear selector or shifter and boot including the exemplary position sensor system shown in FIG. 7A where the gear selector is in a neutral position.

In operation a supply voltage is applied to each hall-effect sensor 214, 216. When no magnetic field is detected, a hall-effect sensor may produce a quiescent output voltage that is commonly ½ the supply voltage. Based on the configuration shown in FIGS. 7A and 7B with a rod neutral position of the boot's 176 center, the permanent magnet 212 strength may be chosen so each hall-effect sensor produces a quiescent output voltage when the transmission gears are disengaged (as shown in FIG. 7C). If a single hall-effect sensor is employed, a larger strength permanent magnet 212 may be employed so a voltage other than the quiescent output voltage is detected for all gear positions including neutral. Because the hall-effect sensors are linear, neutral should be distinguishable in a single sensor embodiment. In a multiple sensor embodiment the system 210 may be able to uniquely sense all possible gear positions (including neutral), such the gear positions such in FIGS. 7A, 7C, and 7D.

Figure 8B:
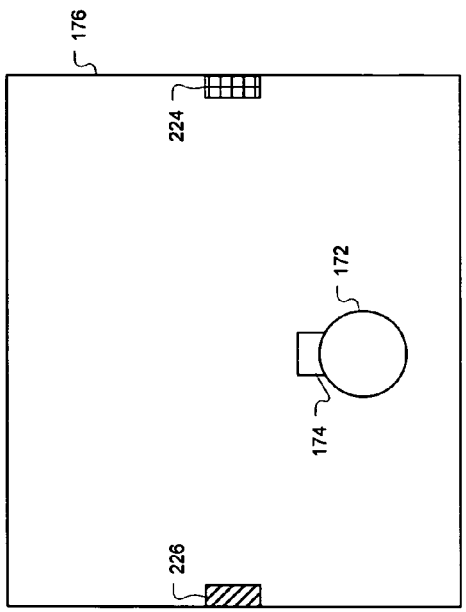
FIG. 8B is a simplified top view of the gear selector or shifter and boot including the exemplary position sensor system shown in FIG. 8A.
Figure 8A:
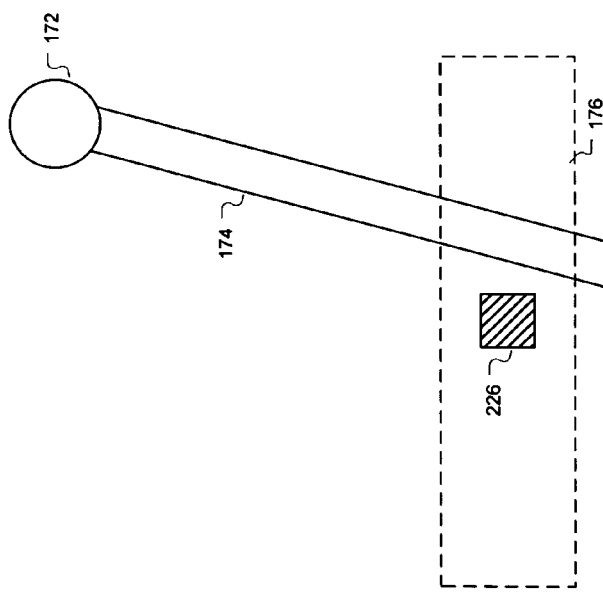
FIG. 8A is a simplified side view of a gear selector or shifter and boot including another exemplary position sensor system in accordance with the present invention where the gear selector is engaging a gear.

The sensor system 210 should work in harsh environment since temperature, dust, and other environmental factors may not prevent the system 210 from determining whether the current rod position corresponds to a neutral position. FIGS. 8A to 8D are simplified block diagrams of another exemplary sensor system 220 in accordance with the present invention. FIG. 8A is a cutaway side view and FIG. 8B is a top view of the exemplary system 220. The exemplary system 220 includes a light emitting diode ("LED") 224 and a photodiode 226. In this exemplary embodiment the LED 224 and photodiode 226 are placed on opposite sides of the boot 176 and never directly contact the rod 174. The LED 224 and photodiode 226 placement may vary as a function of the transmission shift pattern (neutral transmission rod position). In an exemplary embodiment, the LED photonic output is blocked only when the transmission gears are in neutral.

Figure 8D:
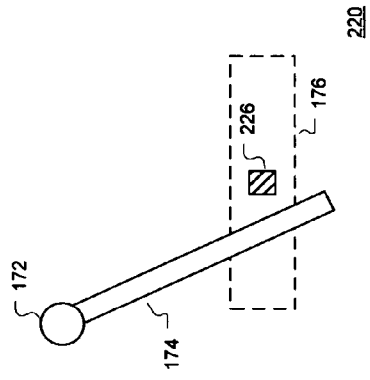
FIG. 8D is a simplified side view of the gear selector or shifter and boot including the exemplary position sensor system shown in FIG. 8A where the gear selector is engaging a gear.
Figure 8C:
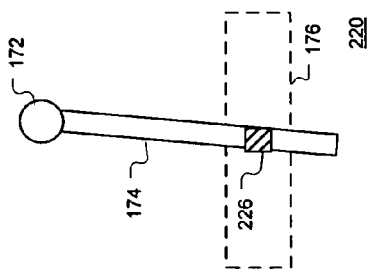
FIG. 8C is a simplified side view of the gear selector or shifter and boot including the exemplary position sensor system shown in FIG. 8A where the gear selector is in a neutral position.
Figure 9:
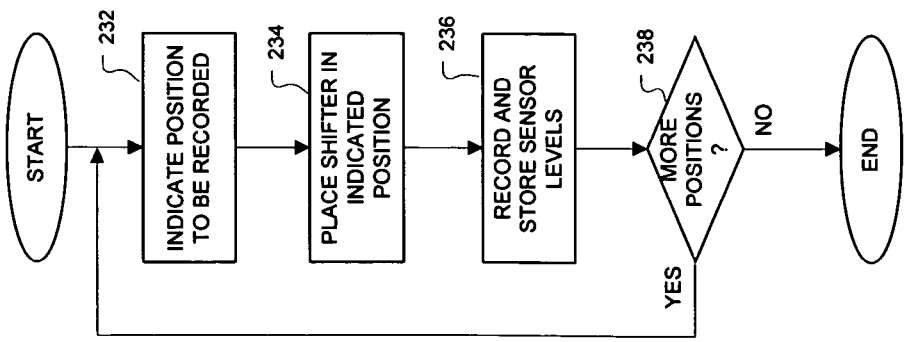
FIG. 9 depicts an exemplary process to calibrate a position sensor system in accordance with the teachings of the present invention.

In operation a supply voltage is applied to the LED 224. The photodiode 226 may be coupled to a linear amplifier and a voltage regulator so it produces a predetermined voltage signal as a function of received light. A filter may be employed on the photodiode 226 so only certain light frequencies stimulate the photodiode in an exemplary embodiment. Based on the configuration shown in FIGS. 8A and 8B with a rod neutral position of the boot's 176 center, the LED output level may be chosen so that at least some minimum level is detected by the photodiode when the gears are disengaged (as shown in FIG. 8C). When the transmission is in gear (based on the rod 174 position) such as shown in FIGS. 8A and 8D, the photodiode 226 may produce a predetermined high level signal. In an exemplary embodiment, a gear position sensor 100 including a position sensor system 210, 220 may calibrate the position sensor system 210, 220. FIG. 9 depicts an exemplary process 230 to calibrate a position sensor system in accordance with the teachings of the present invention.

Figure 10:
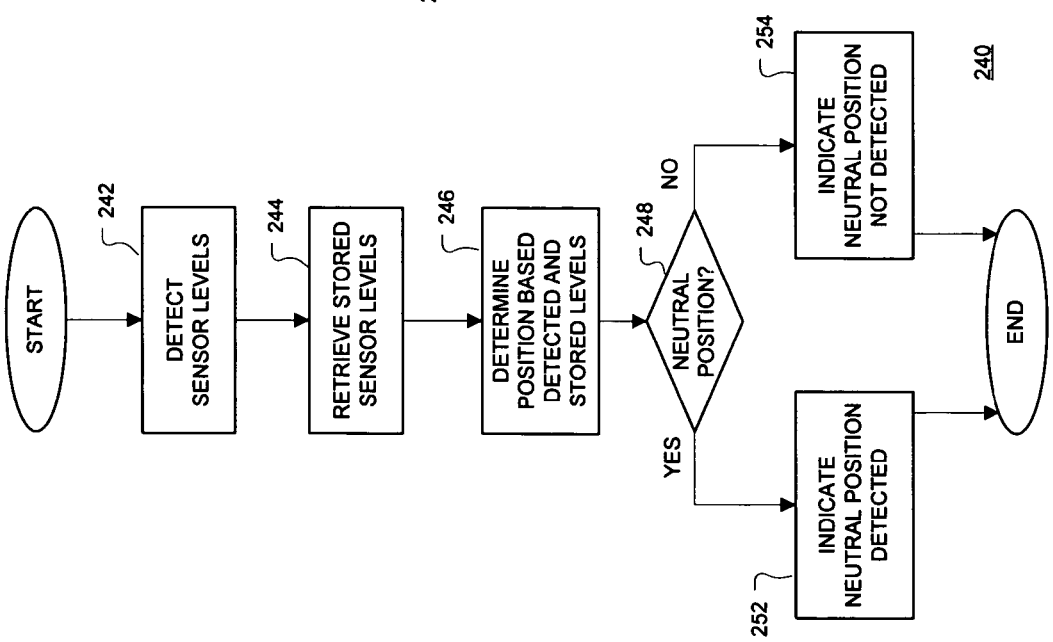
FIG. 10 depicts an exemplary process to determine whether a manual transmission gear selector is in neutral in accordance with the teachings of the present invention.

In this process 230 a user may interact with the gear position sensor 100, a remote start controller 42, or central alarm controller 63 coupled to the gear position sensor 100. The system 100, 42, or 63 may indicate a gear position to be recorded (at step 232). A user may then place the gear shifter 176 into the indicated position. The system 100 may then sample the sensors 214, 216 (FIG. 7A), 226 (FIG. 8A) and store the measured values (at step 236). This process may be repeated for all possible gear positions including neutral (step 238). In the position sensor system 210, the sensor output levels 214, 216 for each possible gear position may be recorded (in a five speed manual transmission, process 230 may be performed for $1^{st}$, $2^{nd}$, $3^{rd}$, $4^{th}$, $5^{th}$, reverse, and neutral gear positions). In the position sensor system 220, the sensor output levels 226 for neutral and non-neutral may be recorded. Once these sensor levels have been recorded they may be used to determine the shifter position in a gear position sensor system 100. FIG. 10 depicts an exemplary process to determine whether a manual transmission gear selector is in neutral 240 based on detected and recorded sensor data.

Figure 11:
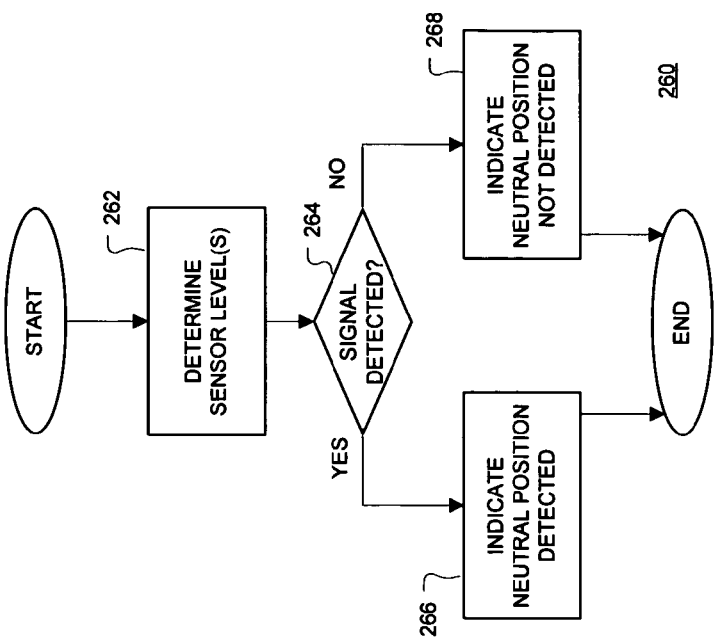
FIG. 11 depicts another exemplary process to determine whether a manual transmission gear selector is in neutral in accordance with the teachings of the present invention.

In the process 240, the sensor levels are measured or detected (step 242). The process may then retrieve stored sensor levels or expected levels for various possible gear positions (step 244). The process then determines which stored sensor data most corresponds to the detected sensor levels and indicates the associated or correlated position (step 246). The process 240 may then indicate whether a neutral or non-neutral gear position was detected (steps 248, 252, 254). When a non-neutral gear position is detected, the process may indicate actual gear position detected, i.e., $1^{st}$, $2^{nd}$, $3^{rd}$, $4^{th}$, $5^{th}$, or reverse gear in a five speed manual transmission. The gear position may be transmitted to the remote device 61 or other wireless device (such as a PDA) via a coded signal. FIG. 11 depicts another exemplary process 260 to determine whether a manual transmission gear selector is in neutral in accordance with the teachings of the present invention.

In the process 260, the sensor levels are determined or detected at step 262. In one exemplary embodiment a shifter is in a neutral gear position when little or no signal is detected (some threshold level) and otherwise in a gear position (such as the sensor system 220 shown in FIG. 8A). The process 260 indicates a neutral gear position has been detected when the signal level is below a certain predetermined threshold (steps 264 and 266) and otherwise indicates a non-neutral gear position has been detected (step 268).

While this invention has been described in terms of a best mode for achieving the objectives of the invention, it will be appreciated by those skilled in the wireless communications art that variations may be accomplished in view of these teachings without deviating from the spirit or scope of the present invention. For example other position sensor systems may be employed in the present invention. FIGS. 12A to 12D depict another exemplary sensor system 270. The system 270 includes an electromechanical transducer 272, a moveable core shaft 274, and a slideable ring 276. The slideable ring 276 is placed on the core rod 174 and coupled to the moveable core shaft 274. The core shaft 274 moves within the transducer 272 as the rod 174 is moved into different gear positions. In an exemplary embodiment the transducer 272 is a Linear Variable Differential Transformer ("LVDT"). The LVDT 272 produces a linearly changing voltage level based on the core rod 274 position within the transducer 272. Accordingly, the LVDT 272 voltage level may be used as a sensor input in the processes 230, 240, or 260 (shown in FIGS. 9 to 11).

Further, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code on a network for remote execution.

What is claimed is:

1. An apparatus for remotely starting an engine coupled to a manual transmission, the apparatus comprising:
    means for wirelessly receiving a remote start request;
    means for determining whether the manual transmission gears are disengaged;
    means for determining whether an alarm system coupled to an engine ignition system of the engine is armed;
    means for starting the engine when the manual transmission gears are determined to be disengaged and the alarm system is determined to be armed;
    means for periodically determining whether the manual transmission gears are disengaged after the engine is remotely started; and
    means for stopping the engine when the manual transmission gears are determined to be engaged.

2. The apparatus for remotely starting an engine coupled to a manual transmission of claim 1, wherein a braking system is coupled to the manual transmission, the apparatus further comprising means for determining whether the braking system is engaged, and wherein the means for starting the engine includes means for starting the engine when the manual transmission gears are determined to be disengaged, the alarm system is determined to be armed, and the braking system is determined to be engaged.

3. The apparatus for remotely starting an engine coupled to a manual transmission of claim 2, wherein the engine ignition system includes an immobilizer and the apparatus further includes means for deactivating the immobilizer when the manual transmission gears are determined to be disengaged, the alarm system is determined to be armed, and the braking system is determined to be engaged.

4. The apparatus for remotely starting an engine coupled to a manual transmission of claim 3, wherein the engine coupled to the manual transmission is part of a passenger vehicle.

5. The apparatus for remotely starting an engine coupled to a manual transmission of claim 4, the apparatus further comprising a door lock monitoring system that indicates whether doors of the passenger vehicle are locked, and wherein the means for starting the engine includes means for starting the engine when the manual transmission gears are determined to be disengaged, the alarm system is determined to be armed, the braking system is determined to be engaged, and the door lock monitoring system indicates the doors are locked.

6. An apparatus for remotely starting an engine coupled to a manual transmission, the apparatus comprising:
means for wirelessly receiving a remote start request;
means for determining whether the manual transmission gears are disengaged;
means for determining whether an alarm system coupled to an engine ignition system of the engine is armed;
means for starting the engine when the manual transmission gears are determined to be disengaged and the alarm system is determined to be armed;
means for periodically determining whether the manual transmission gears are disengaged after the engine is remotely started;
means for periodically determining whether an engine operational parameter is within a predetermined acceptable range; and
means for stopping the engine when the manual transmission one of the gears are determined to be engaged and the engine operational parameter is determined to be out of the predetermined acceptable range.

7. An apparatus for remotely starting an engine coupled to a manual transmission, the apparatus comprising:
means for wirelessly receiving a remote start request;
means for determining whether the manual transmission gears are disengaged; and
means for determining whether an alarm system coupled to an engine ignition system of the engine is armed;
means for starting the engine when the manual transmission gears are determined to be disengaged and the alarm system is determined to be armed;
wherein the means for determining whether the manual transmission gears are disengaged includes:
a sensor located near the gear shifter of the manual transmission where the sensor level varies based on the gear shifter position;
means for detecting the sensor level; and
means for determining whether the manual transmission gears are disengaged based on the detected sensor level.

8. The apparatus for remotely starring an engine coupled to a manual transmission of claim 7, wherein the sensor is a linear hall sensor.

9. The apparatus for remotely starting an engine coupled to a manual transmission of claim 8, the apparatus further including a permanent magnet fixably coupled to the gear shifter and near the sensor.

10. An apparatus for remotely starting an engine coupled to a manual transmission, the apparatus comprising:
means for wirelessly receiving a remote start request;
means for determining whether the manual transmission gears are disengaged;
means for determining whether an alarm system coupled to an engine ignition system of the engine is armed; and
means for starting the engine when the manual transmission gears are determined to be disengaged and the alarm system is determined to be armed;
wherein the means for determining whether the manual transmission gears are disengaged includes:
a sensor located near the gear shifter of the manual transmission where the sensor level varies based on the gear shifter position;
means for detecting the sensor level when the gear shifter position is not engaging a gear;
means for storing the detected sensor level corresponding to the non-engaged gear shifter position;
means for detecting the present sensor level; and
means for determining whether the manual transmission gears are disengaged based on the present detected sensor level and the stored detected sensor level.

11. The apparatus for remotely starting an engine coupled to a manual transmission of claim 10, wherein the sensor is a linear hall sensor.

12. The apparatus for remotely starting an engine coupled to a manual transmission of claim 11, the apparatus further including a permanent magnet fixably coupled to the gear shifter and near the sensor.

13. An apparatus for remotely starting an engine coupled to a manual transmission, the apparatus comprising:
means for wirelessly receiving a remote start request;
means for determining whether the manual transmission gears are disengaged;
means for determining whether an alarm system coupled to an engine ignition system of the engine is armed; and
means for starting the engine when the manual transmission gears are determined to be disengaged and the alarm system is determined to be armed;
wherein the means for determining whether the manual transmission gears are disengaged includes:
a sensor located near the gear shifter of the manual transmission where the sensor level varies based on the gear shifter position;
means for detecting the sensor level when the gear shifter position is engaging a gear;
means for storing the detected sensor level corresponding to the engaged gear shifter position;
means for detecting the sensor level when the gear shifter position is not engaging a gear;
means for storing the detected sensor level corresponding to the non-engaged gear shifter position;
means for detecting the present sensor level; and
means for determining whether the manual transmission gears are disengaged based on the present detected sensor level and stored detected sensor levels.

14. The apparatus for remotely starring an engine coupled to a manual transmission of claim 13, wherein the sensor is a linear hall sensor.

15. The apparatus for remotely starting an engine coupled to a manual transmission of claim 14, the apparatus further including a permanent magnet fixably coupled to the gear shifter and near the sensor.

* * * * *